United States Patent
Obayashi et al.

(10) Patent No.: US 7,942,223 B2
(45) Date of Patent: May 17, 2011

(54) VEHICULAR RADIATOR SUPPORTING APPARATUS

(75) Inventors: Akira Obayashi, Toyota (JP); Akiyoshi Kato, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 55 days.

(21) Appl. No.: 12/427,877

(22) Filed: Apr. 22, 2009

(65) Prior Publication Data
US 2009/0266634 A1 Oct. 29, 2009

(30) Foreign Application Priority Data
Apr. 23, 2008 (JP) .................. 2008-112918

(51) Int. Cl.
*B60K 11/04* (2006.01)
(52) U.S. Cl. .................... 180/68.4; 180/68.1
(58) Field of Classification Search ............ 180/68.1, 180/68.3, 68.4, 68.6; 123/41.43
See application file for complete search history.

(56) References Cited

FOREIGN PATENT DOCUMENTS

| JP | 2004-331002 | 11/2004 |
|---|---|---|
| JP | 2005-335668 | 12/2005 |
| JP | 2006-256461 | * 9/2006 |

OTHER PUBLICATIONS

European Office Action dated Jul. 24, 2009.

\* cited by examiner

*Primary Examiner* — J. Allen Shriver, II
*Assistant Examiner* — Erez Gurari
(74) *Attorney, Agent, or Firm* — Finnegan, Henderson, Farabow, Garrett & Dunner, LLP (57) ABSTRACT

A vehicular radiator supporting apparatus 10 has a pair of radiator support sides 16 and 18 connected to a radiator support upper 12 to be pivoted about a predetermined pivot axis O. To the pair of radiator support sides 16 and 18, a pair of abutting brackets 34 and 36 are integrally fixed at positions corresponding to a height of the bumper reinforcement 54, and they are connected to a pair of vehicle-body side brackets 38 and 40. When applied with a load exceeding a predetermined value and acting rearward of the vehicle, the pair of abutting brackets 34 and 36 are pivoted about the pivot axis O integrally with the pair of radiator support sides 16 and 18 to be displaced rearward of the vehicle. Thus, the vehicular radiator supporting apparatus 10 itself in addition to the radiator main body 20 is prevented from being damaged.

5 Claims, 5 Drawing Sheets

LEFT SIDE CONNECTING SECTION

FIG.2B

RIGHT SIDE CONNECTING SECTION

FIG.5A
STANDARD STATE

FIG.5B
RETREATED STATE

VEHICULAR RADIATOR SUPPORTING APPARATUS

FIELD OF THE INVENTION

This invention relates to a vehicular radiator supporting apparatus which can suppress a damage to the supporting apparatus in addition to a radiator, when a load is applied to the supporting apparatus from a front of a vehicle upon a frontal collision at a low speed.

DESCRIPTION OF THE RELATED ART

There has heretofore been known vehicular cooling device supporting apparatuses for supporting vehicle cooling devices (such as, for instance, a radiator), one type of which includes a radiator support upper, a radiator support lower, and a pair of radiator support sides. The radiator support upper placed in a lateral direction of a vehicle is integrally fixed to a vehicle body, and supports the cooling device at an upper portion thereof. The radiator support lower is placed below the radiator support upper along the lateral direction of the vehicle, and supports the cooling device at a lower portion thereof. The pair of radiator support sides, separated or spaced from each other laterally in the vehicle, vertically extend to straddle the radiator support upper and the radiator support lower for connecting them.

The vehicular cooling device supporting apparatus is located rearward of a bumper reinforcement placed in front of the vehicle. The cooling device is accommodated in an approximately square-shaped space surrounded with the radiator support upper, the radiator support lower and the pair of radiator support sides to be supported thereby. A vehicular cooling device supporting apparatus, disclosed in Patent Document 1 (Japanese Patent Publication 2004-331002), is one example. When the load is applied to the supporting apparatus from the front of vehicle upon the frontal collision at the low speed, the radiator support lower displaces rearward of the vehicle to prevent the occurrence of damage to the cooling device.

However, in the conventional vehicular cooling device supporting apparatus, if a bumper reinforcement interferes with the radiator support sides (radiator core support 25 in Patent Document 1) upon the frontal collision, there is a fear of causing damage to the supporting apparatus itself. Further, if the bumper reinforcement is arranged in abutting contact with the radiator support lower at all times, then there arises a fear of causing restriction to a vehicle design such as a limitation on a height position.

SUMMARY OF THE INVENTION

The present invention has been completed with the above view in mind, and has a first object to provide a vehicular radiator supporting apparatus that can prevent an occurrence of damage to the supporting apparatus itself in addition to the radiator, when a load is applied to the supporting apparatus from the vehicle front upon the frontal collision. A second object is to achieve the first object without limiting height positions of the bumper reinforcement and the radiator.

For achieving the above object, a first aspect of the present invention relates to a vehicular radiator supporting apparatus that comprises a radiator support upper integrally fixed to a vehicle body in a lateral direction of a vehicle for supporting a radiator at an upper portion thereof, a radiator support lower placed below the radiator support upper and mounted on the vehicle body in the lateral direction in the vehicle for supporting the radiator at a lower portion thereof, and a pair of radiator support sides separated apart in the lateral direction of the vehicle and vertically straddling between the radiator support upper and the radiator support lower for connecting the radiator support upper and the radiator support lower. The vehicular radiator supporting apparatus is disposed rearward of a bumper reinforcement placed in front of the vehicle to support the radiator in an approximately square-shaped space surrounded by the radiator support upper, the radiator support lower and the pair of radiator support sides.

Each of the pair of radiator support sides has an upper end portion connected to the radiator support upper to be pivoted about a pivot axis approximately parallel to the lateral direction of the vehicle. Each of a pair of abutting brackets is fixed to each of the pair of radiator support sides integrally at a position corresponding to a height of the bumper reinforcement so as to protrude from the radiator toward the bumper reinforcement. Each of a pair of vehicle-body side brackets is fixed to the vehicle body and connected to each of the pair of abutting brackets to position and support the pair of abutting brackets with a predetermined connecting force, and upon application of a load exceeding a predetermined value and acting rearward of the vehicle to the pair of abutting brackets, it allows the pair of abutting brackets to pivot integrally with the radiator support sides about the pivot axis to be displaced rearward of the vehicle.

In a second aspect of the present invention, each of the pair of radiator support sides is connected to the radiator support upper by a single screw member disposed concentric to the pivot axis. Each of the screw members has a threading direction to have loosening tendency, upon application of a force to pivotally displace each of the lower portions of the radiator support sides rearward of the vehicle, for allowing pivotal movements of the radiator support sides.

In the vehicular radiator supporting apparatus according to the first aspect of the invention, each of the pair of radiator support sides is connected to the radiator support upper to be pivoted about a predetermined pivot axis. Each of the pair of abutting brackets is integrally fixed to each of the pair of radiator support sides at a position corresponding to the height of the bumper reinforcement and is connected to each of vehicle-body side brackets. When the pair of abutting brackets are applied with or receives the load exceeding the predetermined value and acting rearward of the vehicle, they are pivoted integrally together with the radiator support sides about the pivot axis to be displaced rearward of the vehicle.

Accordingly, upon the frontal collision of the vehicle at the low speed, the radiator supporting apparatus itself, in addition to the radiator supported by the vehicular radiator supporting apparatus, can be prevented from i.e. protected from being damaged. Here, since each of the pair of abutting brackets is integrally fixed to each of the pair of radiator support sides at the position corresponding to the height of the bumper reinforcement, there is substantially no fear that limitation is imposed on the vehicle design for height position of the relevant bumper reinforcement and the radiator.

In the vehicular radiator supporting apparatus according to the second aspect of the invention, each of the pair of radiator support sides is connected to the radiator support upper by the single screw member disposed in concentric relation to the pivot axis. Each of the screw members has the threading direction, i.e. a right-handed thread or a left-handed thread that has loosening tendency to permit such pivotal displacement when the lower portion of each of the radiator support sides is applied with or receives a force to pivotally displace the lower portion rearward of the vehicle. This can realize a connecting structure to be simply constructed at a low cost in which each of the radiator support sides is pivotally displaced rearward of the vehicle, and each of the radiator support sides is connected to the radiator support upper with predetermined connecting strength.

BRIEF DESCRIPTION OF THE DRAWINGS

FIGS. 3A and 3B are views illustrating an abutting bracket and a vehicle-body side bracket placed on the radiator support side positioned on a left side as viewed in a front of a vehicle, with FIG. 3A being a perspective view and FIG. 3b being a transverse cross-sectional view.

FIGS. 5A and 5B are left side views illustrating mounting attitudes of various component parts with respect to a vehicle body, with FIG. 5A representing a standard state and FIG. 5B representing a retreated state.

DETAILED DESCRIPTION OF THE PREFERRED EMBODIMENTS

A radiator, supported with a vehicular radiator supporting apparatus of the present invention, is typically comprised of a radiator main body that cools coolant fluid such as engine coolant or the like. However, the present invention can be applied to a vehicular cooling device supporting apparatus which support an another cooling device such as an air conditioning condenser of an air conditioning equipment or the like. In addition, the vehicular radiator supporting apparatus can be constructed to support a plurality of cooling devices including the radiator main body, the air conditioning condenser and the like.

Although a radiator support upper is integrally fixed to, for instance, a frame or the like of a vehicle, it may also be integrally formed with the frame or the like. A pair of radiator support sides have upper end portions connected to the radiator support upper at a predetermined position thereof to be pivoted about a pivot axis. A radiator support lower is straddled between lower ends of the pair of radiator support sides to be integrally connected to them.

In the second aspect of the present invention, each of the pair of radiator support sides is connected to the radiator device support upper with single screw member. However, the pair of radiator support sides are sufficiently connected to predetermined support shaft or the like to be pivoted. Thus, the present invention may be implemented in various modes.

Abutting brackets are integrally fixed to the radiator support sides by fixing means like, for instance, welding or bolts or the like. Vehicle-body side brackets are integrally fixed to the frame or the like of the vehicle body by similar fixing means like, for instance, welding or bolts or the like. The abutting brackets and the vehicle-body side brackets are connected to be relatively pivoted about the pivot axis of the radiator support sides. Such connection between the abutting brackets and the vehicle-body side brackets are achieved for instance by circular arc-shaped elongate holes with a center being placed on the pivot axis and bolts inserted through the elongate holes.

Further, a structure can be realized in which when receiving the predetermined load, the abutting brackets are allowed to displace rearward of a vehicle with respect to the vehicle-body side brackets by adjusting tightening forces of the bolts. Although the elongate holes are formed for example in the vehicle-body side brackets, they may be formed in the abutting brackets. Both the abutting brackets and the vehicle-body side brackets may be connected by deforming members that are plastically deformed upon receipt of the load exceeding the predetermined value applied to the abutting brackets. Thus, the present invention may be implemented in various modes.

Embodiment

Now, one embodiment of the present invention will be described below in detail with reference to the accompanying drawings.

Figure 1A:
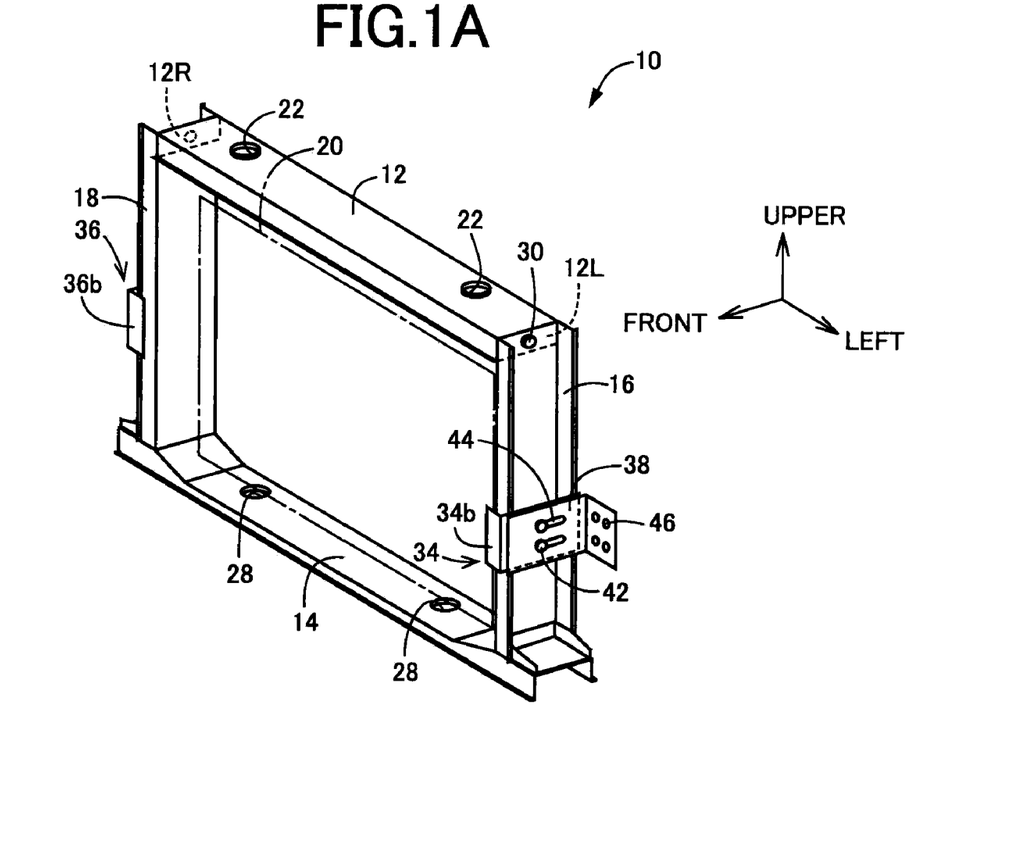
FIGS. 1A and 1B are views illustrating a vehicular radiator supporting apparatus of one embodiment according to the present invention, with FIG. 1A being a perspective view and FIG. 1B being a plan view.
Figure 1B:
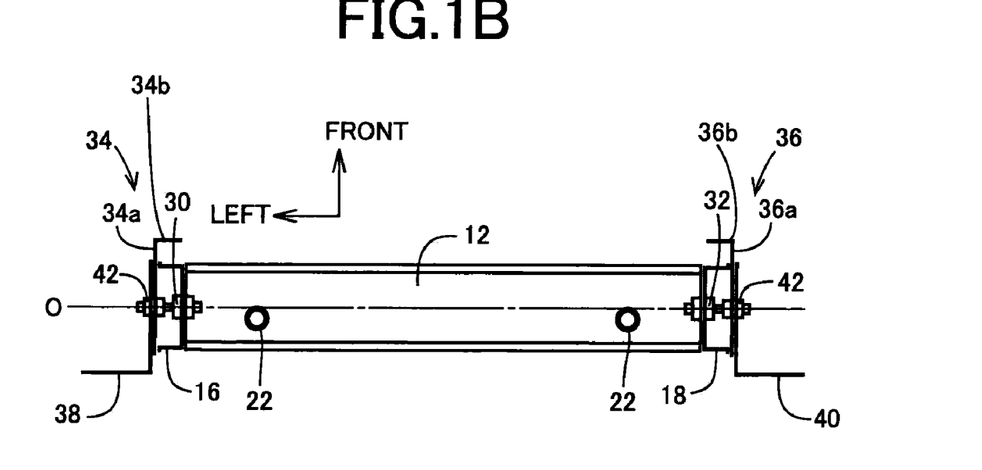

FIGS. 1A and 1B are views illustrating a vehicular radiator supporting apparatus of one embodiment of the present invention. FIG. 1A is a schematic perspective view of the vehicular radiator supporting apparatus 10, and FIG. 1B is a plan view of the same as viewed from an upper side thereof. The vehicular radiator supporting apparatus 10 is mounted on a vehicle in an area rearward of a bumper reinforcement 54 (see FIGS. 5A and 5B) placed in front of the vehicle to support a radiator main body 20 that cools coolant fluid for cooling an engine. The vehicular radiator supporting apparatus 10 includes a radiator support upper 12 laterally placed in an approximately horizontal direction of the vehicle, a radiator support lower 14 placed below the radiator support upper 12 in approximately parallel thereto, and a pair of (left and right) radiator support sides 16 and 18. The pair of radiator support sides 16 and 18 stand in an upper and lower direction (vertical direction) and are apart or separated from each other laterally in the vehicle, and they straddle i.e. span between left and right end portions of the radiator support upper 12 and left and right end portions of the radiator support lower 14 to connect them.

The radiator support upper 12, the radiator support lower 14 and the pair of radiator support sides 16 and 18 form a frame body of an approximately square shape. A radiator main body 20, corresponds to a radiator of the present invention, is integrally mounted in a space surrounded with the frame body to be supported thereby.

The radiator support upper 12 is a press-worked i.e., press-formed product formed in an elongate configuration with approximately U-shaped in cross section. The radiator support upper 12 is approximately horizontally placed on the vehicle in a lateral direction thereof with a U-shaped open side directed downward, and is integrally mounted on a frame (not shown) of the vehicle. In addition, the radiator support upper 12 has a pair of vertically penetrated holding bores 22, formed in laterally separated positions, to serve as upper-side mounting portion for fixedly securing an upper end of the radiator main body 20. The holding bores 22 takes the form of burling bores formed on a flattened portion i.e., a back side portion of the U-shaped configuration of the radiator support upper 12 taking or assuming an horizontal attitude, when the radiator support upper 12 is mounted on the vehicle. The burling bores are simultaneously formed in the press forming of the radiator support upper 12. Each of the holding bores 22 is integrally formed with upwardly protruding cylindrical flanges, on which the upper portion of the radiator main body 20 is integrally held via elastic bodies made of rubber or the like.

The pair of radiator support sides 16 and 18 are press-worked products formed by press forming likewise the radiator support upper 12, and they are laterally separated from each other by a distance corresponding to a length of the radiator support lower 14. Each of the radiator support sides 16 and 18 has an upper end portion connected to the radiator support upper 12. Further, the radiator support lower 14 is a press-worked product formed in an elongate configuration with approximately a U-shape in cross section likewise the radiator support upper 12, and it is disposed on the vehicle in the approximately horizontal direction along the lateral direction of the vehicle such that a U-shaped open side is directed downward. The radiator support lower 14 has left and right end portions to which lower ends of the pair of radiator support sides 16 and 18 are integrally connected by fixing means such as welding, bolts or the like, and it additionally has a pair of holding bores 28 formed in areas laterally separated or spaced from each other, which serve as lower mounting portions for fixedly securing a lower end of the radiator main body 20.

Like the holding bores 22 of the upper mounting section, the holding bores 28 takes the form of burling bores formed on a flattened portion i.e., a back side portion of the U-shaped configuration of the radiator support lower 14 taking or assuming an approximately horizontal attitude, when the radiator support lower 14 is mounted on the vehicle. The burling bores are simultaneously formed in the press forming of the radiator support upper 12. The holding bores 28 are integrally formed with downwardly protruding cylindrical flanges, on which the lower portion of the radiator main body 20 is integrally held via elastic bodies made of rubber or the like.

Figure 2A:
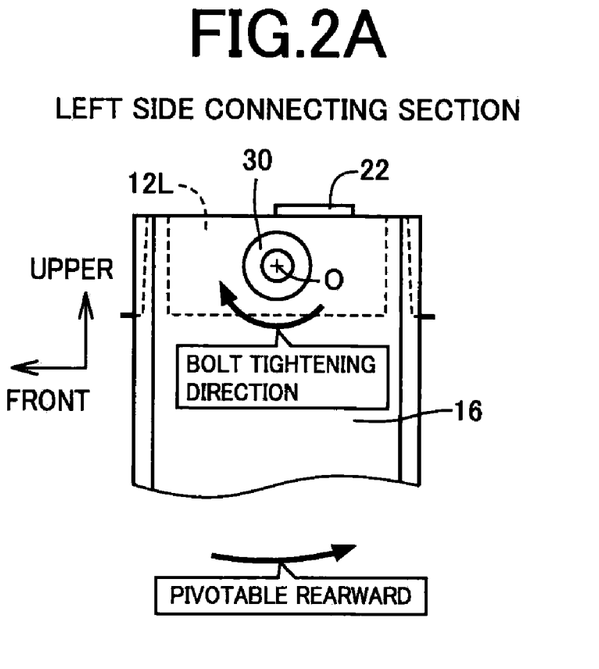
FIGS. 2A and 2B are views illustrating a connecting section between a radiator support upper and a radiator support side, with FIG. 2A being a left side view showing the connecting section on a left side and FIG. 2B showing the connecting section on a right side.
Figure 2B:
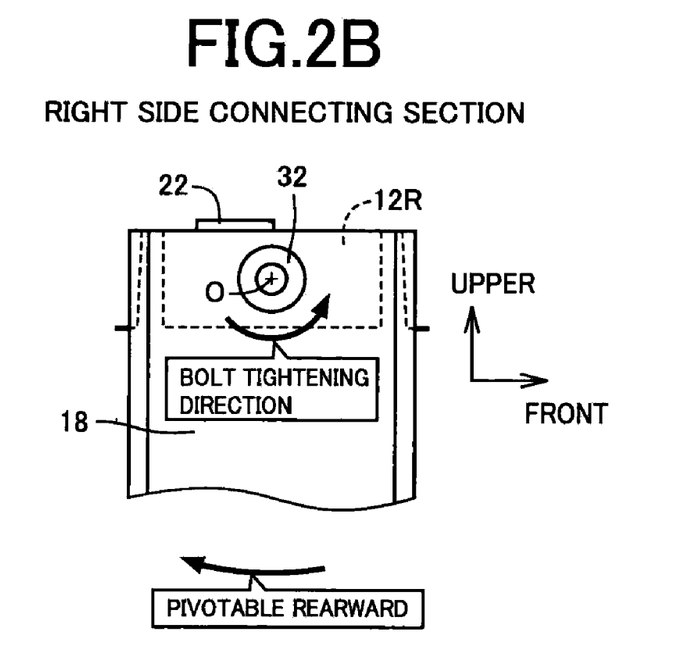

Here, each of the pair of radiator support sides 16 and 18 is connected to each of the left and right connecting portions 12L and 12R formed on the radiator support upper 12 at both of left and right end portions thereof, to be pivoted about a pivot axis O approximately parallel to the lateral direction of the vehicle. As shown in FIGS. 2A and 2B, more particularly, each of the radiator support sides 16 and 18 is connected to each of the left and right connecting portions 12L and 12R of the radiator support upper 12 by single screw member 30 or 32 disposed in concentric relation to the pivot axis O. In addition, each of the screw members 30 and 32 has a thread having a threading direction, i.e., a right-handed screw or a left-handed screw. These threads are determined such that the screw members 30 and 32 have loosening tendency to allow the pivotal displacement of the radiator support sides 16 and 18, when the lower end portions of the radiator support sides 16 and 18 receive the force in the direction to pivotally displace rearward of the vehicle. The connecting portions 12L and 12R correspond to folded portions which are folded downward at both end edges of the radiator support upper 12 in an approximately vertical direction.

In the left-side connecting section shown in FIG. 2A, a nut member (not shown) is integrally fixed to an inside of the connecting portion 12L by welding or the like. Inserting the screw member 30 through the radiator support side 16 to be screwed into the nut member allows the radiator support side 16 to be connected to the connecting portion 12L under a tightened condition. However, the screw member 30 having the right-handed screw to be tightened clockwise direction, has loosening tendency to rotate counterclockwise direction, that allows the radiator support side 16 to pivot in a rearward direction, upon receipt of the force acting counterclockwise direction to cause the lower portion thereof to pivot rearward of the vehicle.

Further, in the right-side connecting section shown in FIG. 2B, further, a nut member (not shown) is integrally fixed to an inside of the connecting portion 12R by welding or the like. Inserting the screw member 32 through the radiator support side 18 to be screwed into the nut member allows the radiator support side 18 to be connected to the connecting portion 12R under a tightened condition. However, with the screw member 32 of the left-handed screw being used and tightened counterclockwise direction, the screw member 32 has loosening tendency to rotate clockwise direction, that allows the radiator support side 18 to pivot in a rearward direction, upon receipt of the force acting clockwise direction to cause the lower portion thereof to pivot rearward of the vehicle.

Turning back to FIGS. 1A and 1B, the left and right abutting brackets 34 and 36 are fixedly and integrally secured to the radiator support sides 16 and 18 on external sides thereof laterally in the vehicle by welding or the like at a position corresponding to a height of the bumper reinforcement 54, i.e., at approximately the same height as that thereof. The abutting brackets 34 and 36 are formed in symmetric shapes and have L-shaped configurations including portions extending forward of the vehicle to be remote from the radiator 20, i.e., protruding in a direction to come closer or to approach to the bumper reinforcement 54, and portions folded at an approximately right angle in a direction to come close to each other. More particularly, one abutting bracket 34 has a rectangular base portion 34a fixedly attached to the radiator support side 16, and a folded portion 34b folded at a forward edge of the base portion 34a at an approximately right angle. Other abutting bracket 36 has a structure similar to that of the abutting bracket 34. The folded portions 34b and 36b correspond to folded portion of the present invention.

The left and right vehicle-body side brackets 38 and 40 are disposed on the abutting brackets 34 and 36 at external sides thereof in the lateral direction of the vehicle. The vehicle-body side brackets 38 and 40 are integrally fixed to a frame of the vehicle by welding or bolts, and are connected to the abutting brackets 34 and 36 by the two connecting bolts 42 with predetermined connecting forces, respectively. Nut members are integrally fixed to the abutting brackets 34 and 36 by welding or the like, respectively. The vehicle-body side brackets 38 and 40 have elongate holes, through which the connecting bolts 42 extend. By tightening the connecting bolts 42 to the nut members 43, the abutting brackets 34 and 36 are positioned at predetermined positions with predetermined connecting forces. Thus, the vehicular radiator supporting apparatus 10 is positioned and supported under a standard state i.e., attitude to be suspended in an approximately vertical direction.

Figure 3A:
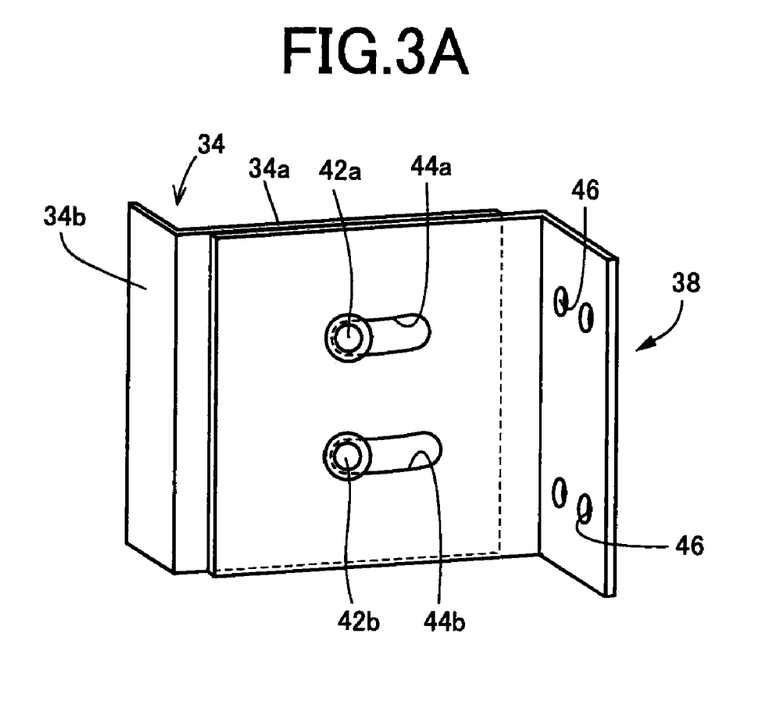
Figure 3B:
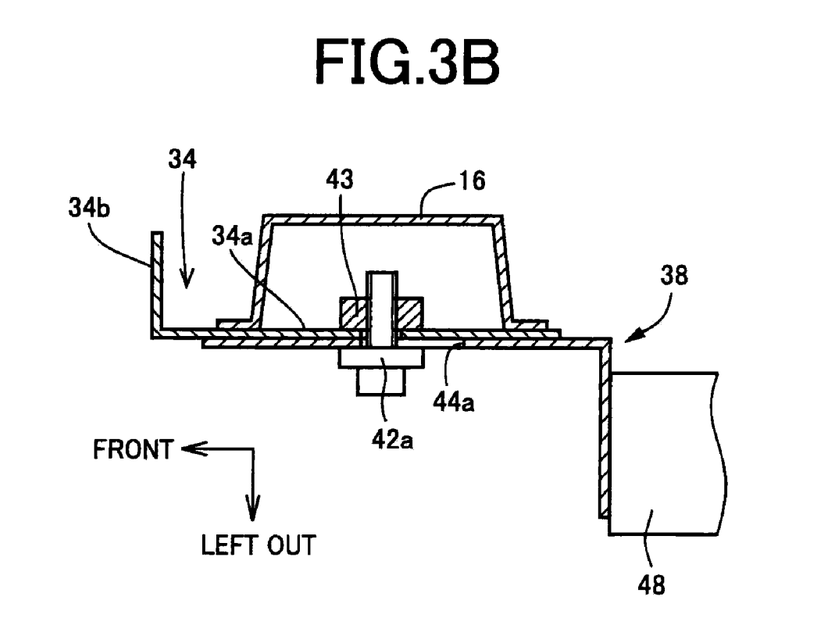
Figure 4:
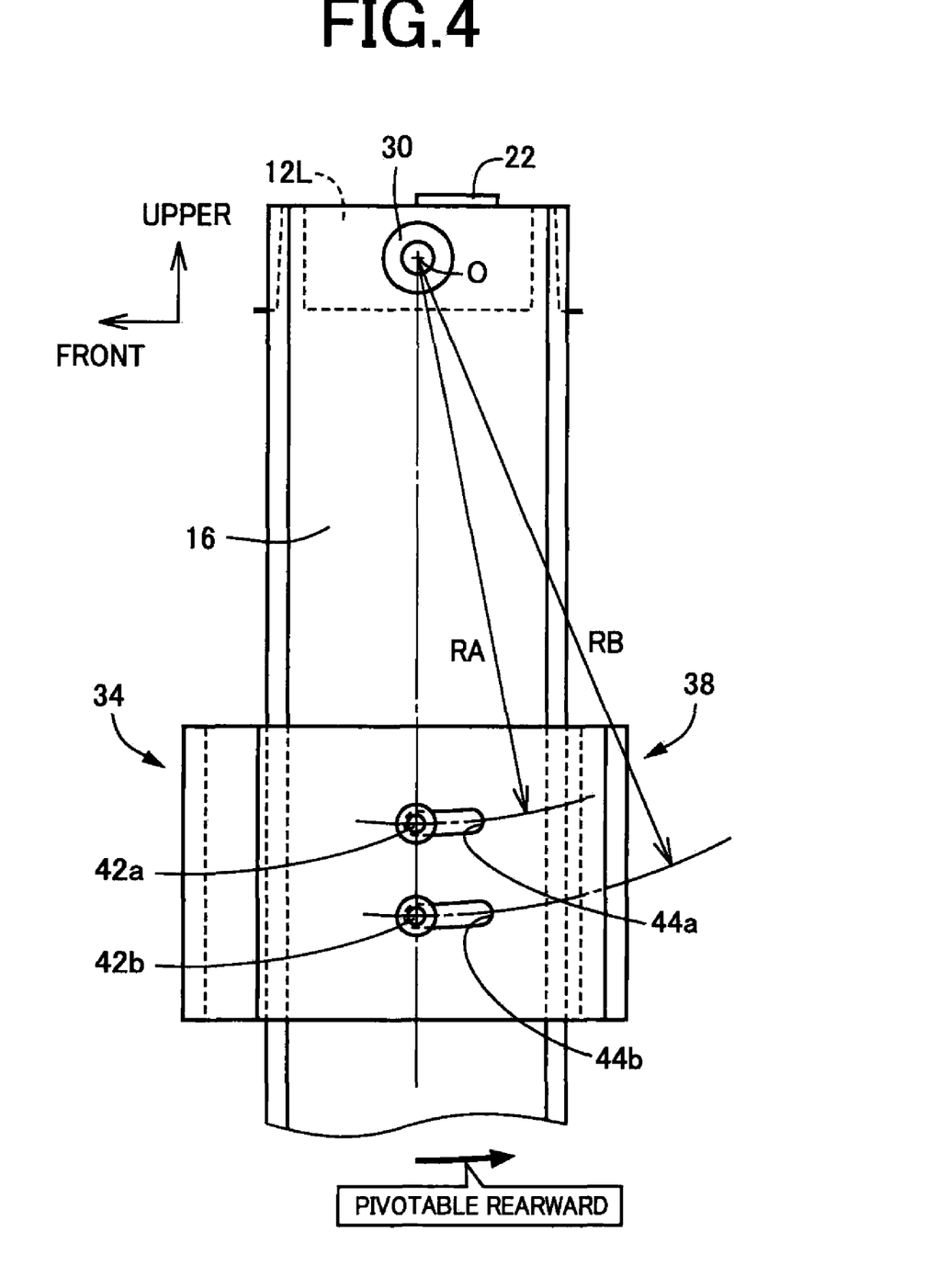
FIG. 4 is a left side view showing the radiator support side, the abutting bracket and the vehicle-body side bracket located on the left side as viewed in the front of the vehicle, FIG. 4 explaining a manner how the radiator support side and the abutting bracket pivot counterclockwise about the pivot axis with respect to the vehicle-body side bracket.

FIGS. 3A and 3B and FIG. 4 are views illustrating the abutting bracket 34 and the vehicle-body side bracket 38, placed on the left-hand radiator support side 16 as viewed in a forward direction of the vehicle. FIG. 3A is a perspective view of the abutting bracket 34 and the vehicle-body side bracket 38, and FIG. 3B is a transverse cross-sectional view approximately horizontally broken at the upper connecting bolt 42a. As apparent from FIG. 4, the vehicle-body side bracket 38 has vertically separated upper and lower areas on which a pair of elongate holes 44 are formed in circular arc configurations having radii RA and RB with a center on a pivot axis "O", respectively.

In FIGS. 3A and 3B and FIG. 4, the pairs of connecting bolts 42 and the pairs of elongate holes 44 have suffixes "a" and "b" for distinction, respectively. The connecting bolt and the elongate hole placed in upper areas have reference numerals "42a" and "44a", respectively, whereas the connecting bolt and the elongate hole placed in lower areas have reference numerals "42b" and "44b", respectively. In addition, the vehicle-body side bracket 38 has a plurality of mount holes 46 which allows fixing bolts (not shown) to penetrate for integrally connecting the vehicle-body side bracket 38 to a vehicle body member such as a vehicle frame or the like. In addition, the abutting bracket 36 and the vehicle-body side bracket 40 placed on opposite side have substantially the same structures as the abutting brackets 34 and the vehicle-body side bracket 38 shown in FIGS. 3A and 3B and FIG. 4, except for a bilaterally symmetric configuration.

The upper elongate hole 44a is formed in a circular arc having the radius RA with the center on the pivot axis "O", and the lower elongate hole 44b is formed in a circular arc having the radius RB with the center on the pivot axis "O". Each of the upper and lower elongate holes 44a and 44b extends from one position approximately directly below the pivot axis "O" to the other position rearward of the vehicle. This permits, together with the connecting bolts 42a and 42b screwed into the nut members 43 integrally fixed to the abutting bracket 34 by welding or the like, the abutting bracket 34 and the lower end of the radiator support side 16 to pivot counterclockwise about the pivot axis "O" toward a rear side of the vehicle.

That is, adjusting the tightening forces of the connecting bolts 42a and 42b allows the abutting bracket 34 and the vehicular radiator supporting apparatus 10 to be positioned in the standard attitude, shown in FIG. 4, with the predetermined connecting forces. With positioning the vehicular radiator supporting apparatus 10 in the standard attitude, when a frontal collision of the vehicle occurs at a low speed, the bumper reinforcement 54 is moved backward and brought into contact with the abutting bracket 34 to apply thereto the load F exceeding a predetermined value. Thus, the abutting bracket 34 and the vehicular radiator supporting apparatus 10 (strictly speaking, at areas below the radiator support sides 16 and 18) are permitted to pivotally displace rearward of the vehicle with respect to the vehicle-body side bracket 38.

Figure 5A:
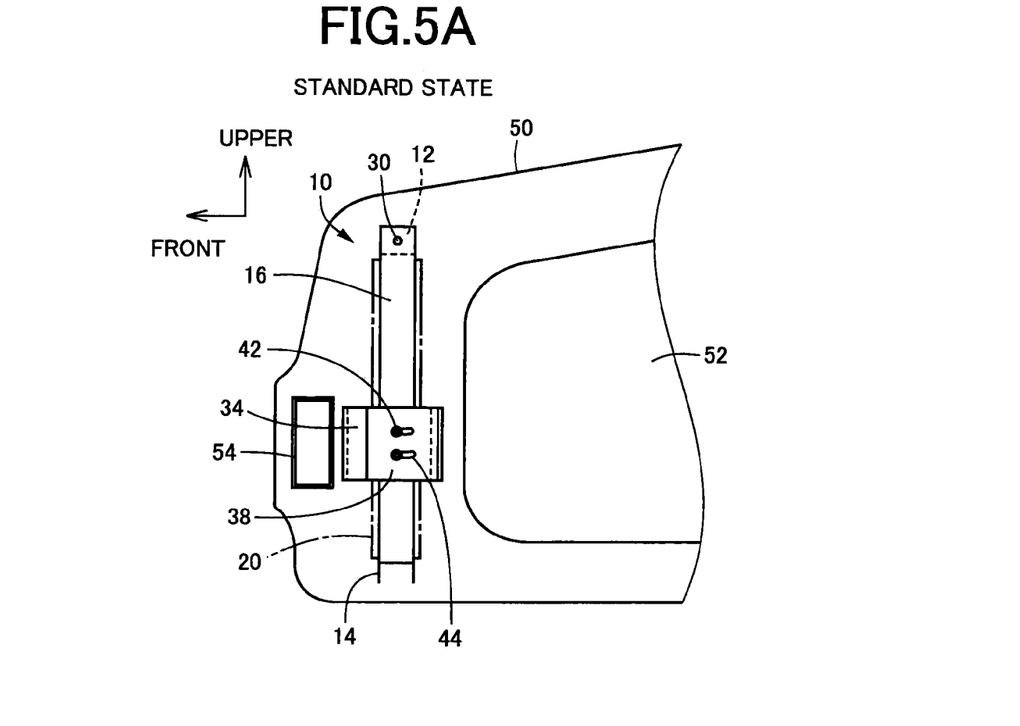
Figure 5B:
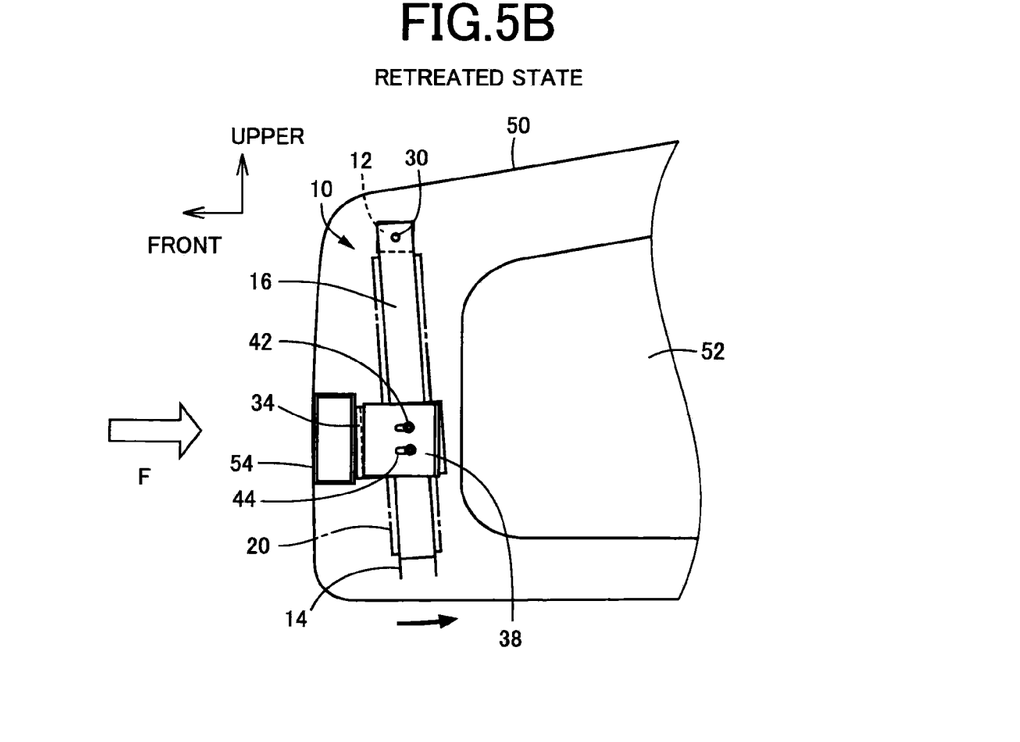

FIGS. 5A and 5B are side views as viewed from a left side of the vehicle. They represent the attitude of the vehicular radiator supporting apparatus 10 mounted on the vehicle body 50, and positional relationships between the vehicular radiator supporting apparatus 10, an engine 52 and the bumper reinforcement 54. FIG. 5A shows the vehicular radiator supporting apparatus 10 supporting the radiator main body 20 in a standard state i.e., a standard attitude to be suspended in the approximately vertical direction. In the standard attitude of the vehicular radiator supporting apparatus 10, a predetermined clearance is formed between the abutting bracket 34 and the bumper reinforcement 54.

FIG. 5B shows the vehicular radiator supporting apparatus 10 in a retreated attitude i.e., retracted state which takes or assumes upon the frontal collision of the vehicle at the low speed. In the retreated attitude of the vehicular radiator supporting apparatus 10, the abutting brackets 34 and 36 and the vehicular radiator supporting apparatus 10 are pivotally displaced rearward of the vehicle with respect to the vehicle-body side brackets 38 and 40. When the bumper reinforcement 54, under retreating, is brought into contact with the abutting brackets 34 and 36, the abutting brackets 34 and 36 and the vehicular radiator supporting apparatus 10 are pivotally displaced upon receipt of the load F exceeding the predetermined value. With such displacements, the connecting bolts 42a and 42b are caused to move in the elongate holes 44a and 44b from left ends to right ends.

Here, since the abutting brackets 34 and 36 are placed so that the folded portions 34b or the like protrude forward from the radiator main body 20, no fear occurs for the radiator main body 20 to be damaged even when they are pivotally displaced. Further, the vehicular radiator supporting apparatus 10 itself is arranged to be pivoted about the pivot axis "O" (on axes of the screw members 30 and 32). Also, the connecting bolts 42a and 42b are permitted to move in the elongate holes 44a and 44b of the vehicle-body side brackets 38 and 40. Thus, no fear occurs for the radiator main body 20 to be damaged as long as the pivotal displacement thereof remains within a pivotal-displacement acceptance range.

Further, the connecting bolts 42 is, after being loosened to restore the vehicular radiator supporting apparatus 10 to the standard attitude shown in FIG. 5A, tightened again with predetermined tightening strength. Thus, an original state of the vehicular radiator supporting apparatus 10 can be easily recovered. Consequently, in addition to the radiator main body 20, a whole of the vehicular radiator supporting apparatus 10 itself can be reused, which includes the radiator support upper 12, the radiator support lower 14, the pair of radiator support sides 16 and 18, the abutting brackets 34 and 36, and the vehicle-body side brackets 38 and 40.

Thus, in the vehicular radiator supporting apparatus 10 of the present embodiment, the pair of radiator support sides 16 and 18 are connected to the radiator support upper 12 to be pivoted about the predetermined pivot axis "O". In addition, the abutting brackets 34 and 36 are integrally fixed to the radiator support sides 16 and 18 at the position corresponding to the height of the bumper reinforcement 54, and they are connected to the vehicle-body side brackets 38 and 40, respectively. When the load F exceeding the predetermined value is applied in the rearward direction of the vehicle, the abutting brackets 34 and 36 are allowed to pivot together with the radiator support sides 16 and 18 about the predetermined pivot axis "O" to be displaced rearward of the vehicle.

As a result, upon the frontal collision of the vehicle at the low speed, in addition to the radiator main body 20, the vehicular radiator supporting apparatus 10 itself can be prevented from being damaged. Here, since the abutting brackets 34 and 36 are fixedly attached to the radiator support sides 16 and 18 depending on the heights of the bumper reinforcement 54, no restriction is imposed on a vehicle design in relation to the height positions of the bumper reinforcement 54 and the radiator main body 20.

Further, in the present embodiment, each of the pair of radiator support sides 16 and 18 are connected to the radiator support upper 12 by each of the single screw members 30 and 32 concentrically disposed on the predetermined pivot axis "O". In addition, the screw members 30 and 32 have the left-handed thread or the right-handed thread to be loosened, when the radiator support sides 16 and 18 receive the rearward force at the lower portions, to permit pivotal displacement thereof. Therefore, a connecting structure can be simply provided at low cost in which the radiator support sides 16 and 18 are permitted to be pivotally displaced rearward of the vehicle, and are connected to the radiator support upper 12 with the predetermined connecting strength.

The present invention has been described above with reference to the accompanying drawings, it is intended that the embodiment described be considered only as illustrative of the present invention. It is noted that the present invention can be embodied in modes with various modifications and improvements based on knowledge of those skilled in the art.

What is claimed is:

1. A vehicular radiator supporting apparatus comprising:
   (i) a radiator support upper integrally fixed to a vehicle body in a lateral direction of a vehicle for supporting a radiator at an upper portion thereof, a radiator support lower placed below the radiator support upper and mounted on the vehicle body in the lateral direction in the vehicle for supporting the radiator at a lower portion thereof, and a pair of radiator support sides separated apart in the lateral direction of the vehicle and vertically straddling between the radiator support upper and the radiator support lower for connecting the radiator support upper and the radiator support lower; and
   (ii) being disposed rearward of a bumper reinforcement placed in front of the vehicle to support the radiator in an approximately square-shaped space surrounded by the radiator support upper, the radiator support lower and the pair of radiator support sides,
   each of the pair of radiator support sides having an upper end portion connected to the radiator support upper to be pivoted about a pivot axis approximately parallel to the lateral direction of the vehicle;
   each of a pair of abutting brackets fixed to each of the pair of radiator support sides integrally at a position corresponding to a height of the bumper reinforcement so as to protrude from the radiator toward the bumper reinforcement; and
   each of a pair of vehicle-body side brackets (a) being fixed to the vehicle body and connected to each of the pair of abutting brackets to position and support the pair of abutting brackets with a predetermined connecting force, and (b) upon application of a load exceeding a predetermined value and acting rearward of the vehicle to the pair of abutting brackets, allowing the pair of abutting brackets to pivot integrally with the radiator support sides about the pivot to be displaced rearward of the vehicle;
   wherein each of the pair of radiator support sides is connected to the radiator support upper by a single screw member disposed concentric to the pivot axis, and each of the screw members has a threading direction to have a loosening tendency, upon application of a force to pivotally displace each of the lower portions of the radiator support sides rearward of the vehicle, for allowing pivotal movements of the radiator support sides.

2. The vehicular radiator supporting apparatus according to claim 1, wherein each of the pair of abutting brackets has a base portion fixedly secured to each of the pair of radiator support sides, and a folded portion folded at a right angle with respect to the base portion so as to protrude toward the bumper reinforcement.

3. The vehicular radiator supporting apparatus according to claim 1, wherein each of the pair of abutting brackets is connected to each of the pair of vehicle-body side brackets so as to relatively pivot about the pivot axis of each of the radiator support sides.

4. The vehicular radiator supporting apparatus according to claim 3, wherein each of the pair of vehicle-body side brackets has a circular-arc shaped elongate hole with a center placed on the pivot axis, and is connected to each of the pair of abutting brackets by each of connecting bolts extending through the elongate holes to be screwed into each of the pair of abutting brackets.

5. The vehicular radiator supporting apparatus according to claim 4, wherein a tightening force of each of the connecting bolts is adjustable.

* * * * *